March 14, 1967   H. J. DESFILLES   3,308,975
BOAT-TRANSPORTER TRAILER
Filed Nov. 24, 1964   2 Sheets-Sheet 2
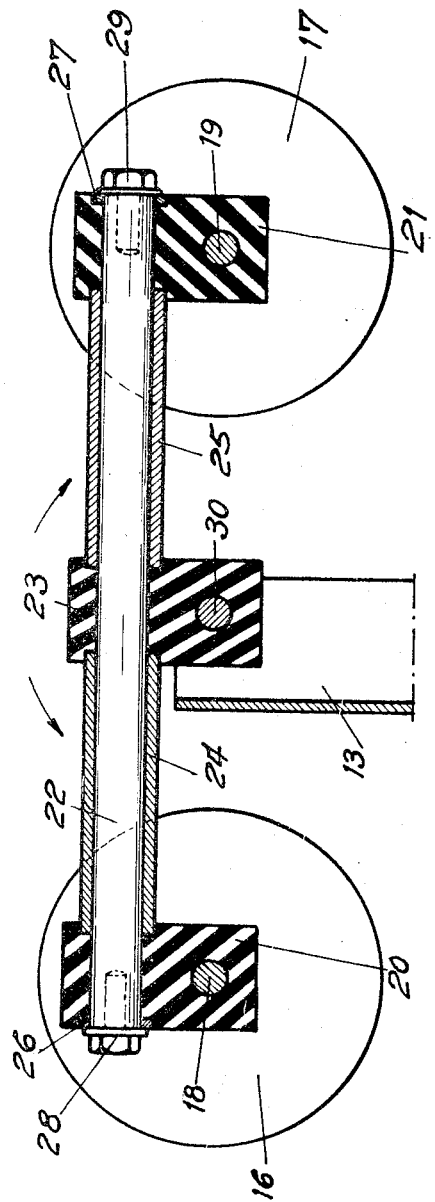
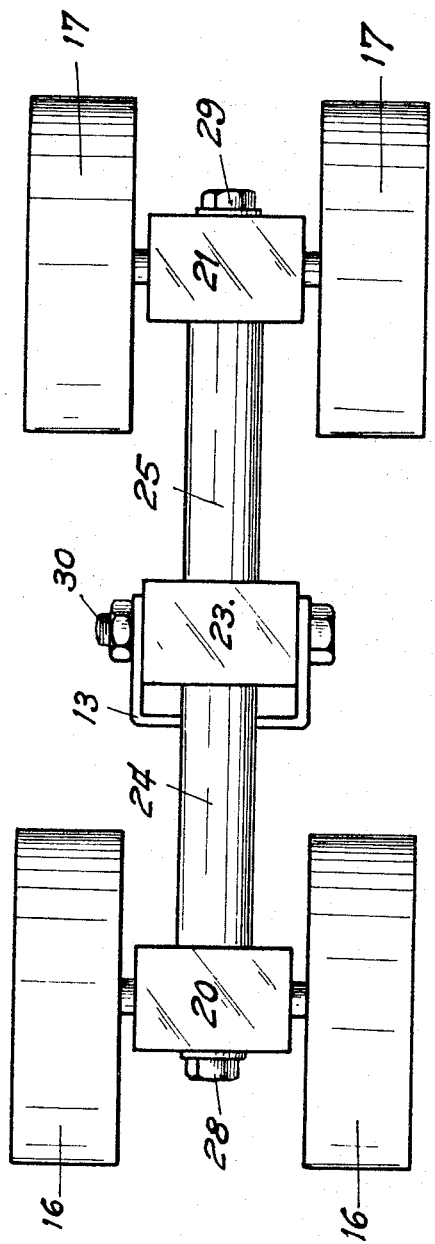
INVENTOR
HENRI JEAN DES FILLES
BY
Woodhams, Blanchard & Flynn
ATTORNEYS 3,308,975
BOAT-TRANSPORTER TRAILER
Henri Jean Desfilles, Ormesson-sur-Marne, France, assignor to Le Tube Manufacture Pour Manutention et Remorques-Nautilus, Ormesson-sur-Marne, France, a company of France
Filed Nov. 24, 1964, Ser. No. 413,485
Claims priority, application France Nov. 26, 1963, 955,008, Patent 1,386,342
4 Claims. (Cl. 214—84)

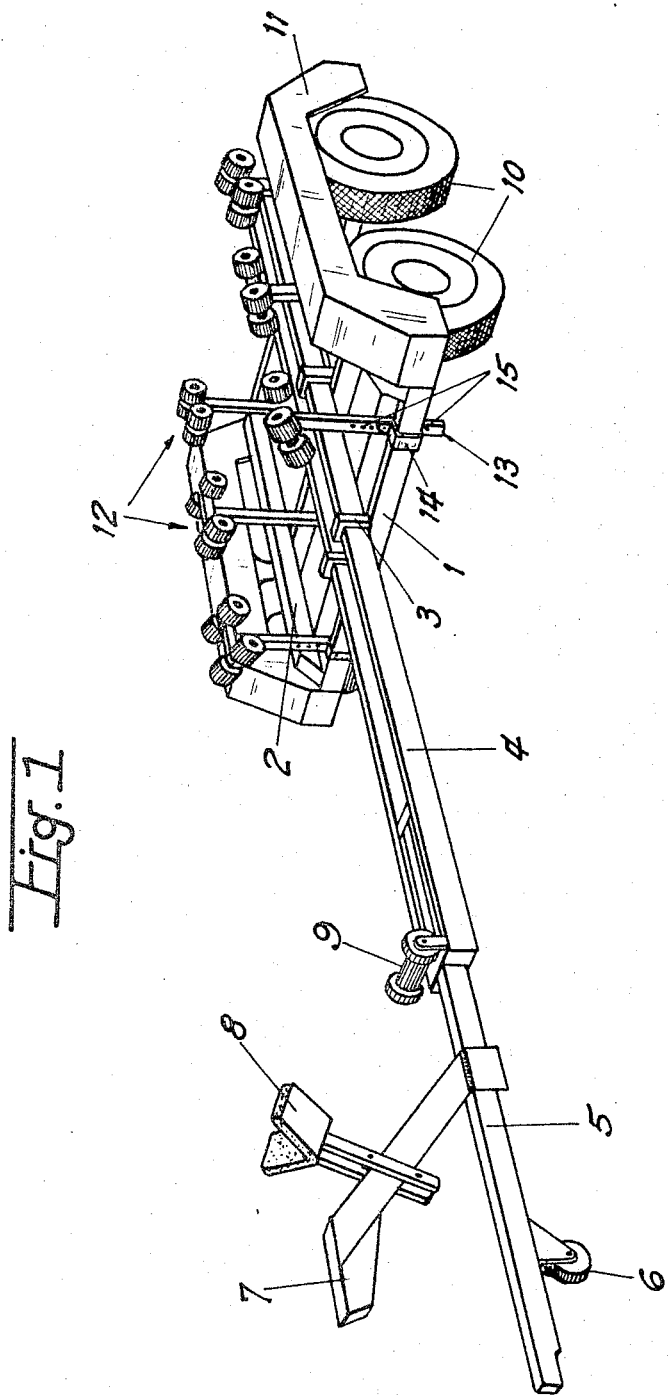

The present invention relates to a boat-transporter trailer of the type comprising a certain number of cradles designed to support the hull of the boat to be transported, said cradles being mounted on a frame which is provided with the usual drawing and rolling devices.

The chief disadvantage attached to the trailers of this type which have been in use up to the present time, particularly if such trailers are designed for relatively cumbersome craft and consequently necessitate a relatively large number of cradles, lies in the fact that they are not readily adaptable to the highly diversified curvatures of hulls which, in addition, vary from one boat to another and even in the same boat along the transverse plane on which a cradle is located.

In such cases, the utilization of cradles which can be adjusted separately is liable to result in a substantial loss of time for the user. Over and above these difficulties are those which arise from the fact that the weight of boats is often such that the trailer must be designed for direct launching and picking up, which calls for the construction of cradles in the form of sets of runner-wheels or rollers which must be adaptable to the different successive cross-sections of the same hull.

The object of this invention is to overcome these drawbacks by providing users with a trailer having cradles which are automatically adaptable to the curvature of the hull with which they are in contact and which can if necessary also be employed for the purpose of direct launching and picking-up of boats by permitting these latter to roll on the cradles.

To this end, a trailer in accordance with the invention is characterized in that at least a certain number of cradles are constituted by pairs of roller-supports coupled to the upright member on which they are carried by means of a double articulation about two non-parallel shafts.

As a preferable feature, one of the pivotal shafts of the aforesaid double articulation system is longitudinal and the other pivotal shaft is transverse with respect to the trailer.

In a preferred form of embodiment of the invention, each cradle is provided with two pairs of articulated roller-supports which are each pivotally mounted at the end of a longitudinal shaft, said shaft being in turn pivotally coupled to a cross-pin which is carried by the upright member.

According to another improvement, each roller-support is designed in the form of a runner-wheel having a transverse axis of rotation.

It will be understood that the foregoing arrangements ensure a perfect seating of the hull on the cradles irrespective of the shape of the hull and that, in the case in which provision is made for rollers, said cradles additionally form a deformable roller track for the purpose of launching and picking-up of the boat.

A clear understanding of the invention will in any case be gained by consideration of the description which now follows, reference being made in the accompanying drawings in which one form of embodiment of the invention is shown by way of example without implied limitation, and in which:

FIG. 1 is a view in perspective of a trailer according to the invention;

FIG. 2 is an overhead view on a larger scale of one of the cradles of the trailer according to FIG. 1; and FIG. 3 is a side view of the same cradle.

The trailer which is illustrated in FIG. 1 comprises a frame which is made up of cross-members 1 which are welded to two side members 2 and joined by means of stirrup members 3 to two central longitudinal members 4. The frame is fitted with a drawbar 5 carrying a wheeled support 6 and an upright arm 7 for a front cradle 8. Said frame also carries at the front a lower cradle 9 which can be a shouldered roller on which the keel of the boat can run.

It will be understood that the frame is carried by one or a number of sets of wheels 10, four wheels having been provided in the example which has been chosen. A mudguard or fender has been shown at 11.

All of the foregoing members are well known and will not be described further in detail.

On the other hand, in accordance with the invention, the frame is designed to carry a certain number of cradles 12 which are six in number in the example chosen. Said cradles are mounted laterally on U-section upright members 13 which are fixed on the cross-members 1 by means of stirrup-members 14 in such manner as to be adjustable for height. For this purpose, the upright members are provided with a series of holes such as the hole 15.

As is shown more clearly in FIGS. 2 and 3, each cradle is constituted by a pair of front rollers 16 and a pair of rear rollers 17 which are rotatably mounted on two shafts 18 and 19 which pass through two blocks 20 and 21 of rubber or like elastic material. The blocks 20 and 21 in which is formed a first bore providing a passageway for the shafts 18 and 19 are additionally provided with a second bore at right angles to the first for the passage of a common longitudinal shaft 22 which similarly traverses a third identical block 23.

The three blocks are held in position on the shaft 22 by means of two spacer sleeves 24 and 25 and by means of washers 26 and 27 which are held in position by means of end screws 28 and 29.

Recesses have additionally been provided in the three blocks for the washers and for the ends of the spacer sleeves.

The block 23 in its turn is traversed by a cross-pin 30 which is inserted through and screwed onto the flanges of the upright member 13.

It will be understood that an assembly as thus constructed is capable of performing a pivotal motion about the cross-pin 30. In addition, each block 20 or 21 and therefore each pair of rollers is capable of pivoting about the longitudinal shaft 22.

The result thereby achieved is that, if a boat is placed on the trailer according to FIG. 1, the six cradles are automatically adapted to the shape of the hull and thus afford perfect seating. Furthermore, the boat can be placed on the trailer by being caused to run along the rollers 16 or 17 and over the roller 9. Similarly, for the purpose of launching the boat in the water, the reverse movement is possible.

In fact, during these movements, the cradles 12 are automatically adapted to the different profiles of the hull during the movement of this latter.

Finally, it will be noted that the cost price of the assembly of cradles is very low, particularly by reason of the fact that three identical blocks have been provided for each cradle.

It will in any case be apparent that the form of embodiment of the invention which has just been described has been given solely by way of example without implied limitation and that numerous modifications can be made therein without consequently departing either from the scope or the spirit of the invention.

What I claim is:

1. In a boat trailer, the combination comprising:
a longitudinal frame having laterally spaced wheels for supporting the frame on the ground;
a plurality of cradles mounted on said frame and arranged thereon for supporting a boat hull;
each cradle including an elongated roller support extending lengthwise of said frame and mounting means mounting said roller support on said frame for pivotal movement about a transverse pivot axis, two pairs of laterally spaced rollers and mounting means for rotatably mounting the pairs of rollers on said roller support and also mounting the respective pairs of rollers for pivotal movement about the longitudinal axis of said roller support independent of the other pair of rollers, the respective pairs of rollers being disposed on opposite sides of said transverse pivot axis and the rollers of each pair being disposed on opposite sides of the longitudinal axis of said roller support.

2. A boat trailer according to claim 1, in which the cradles are arranged to form a pair of laterally spaced, longitudinally arranged banks;
an upright associated with each cradle, the upright being secured at its lower end to said frame and each cradle being mounted for pivotal movement about said transverse pivot axis with respect to its associated upright whereby the cradles are individually movable and the pairs of rollers of each cradle are independently movable.

3. A boat trailer according to claim 2, in which said roller support is an elongated rod means, and the mounting means for said roller support and the mounting means for said rollers comprise three support members which are spaced apart along said rod means, said support members having corresponding aligned longitudinal openings therethrough through which said rod means rotatably extends, said blocks having transverse openings therethrough and pin means extending through said transverse openings for coupling said support members to said upright and to said pairs of wheels, respectively.

4. A boat trailer according to claim 3, in which said support members each comprise a one-piece block made of rubber-like material.

References Cited by the Examiner

UNITED STATES PATENTS

| | | | |
|---|---|---|---|
| 2,889,946 | 6/1959 | Holsclaw | 214—84 |
| 3,058,756 | 10/1962 | Holsclaw | 214—84 X |
| 3,077,277 | 2/1963 | Holzman | 214—84 |
| 3,104,770 | 9/1963 | Calkins et al. | 214—84 |

GERALD M. FORLENZA, *Primary Examiner.*

ALBERT J. MAKAY, *Examiner.*